United States Patent [19]

Reed

[11] Patent Number: 5,712,424

[45] Date of Patent: Jan. 27, 1998

[54] METHOD AND APPARATUS FOR MEASURING DIESEL ENGINE CYLINDER PRESSURE

[75] Inventor: Jay R. Reed, Mullica Hill, N.J.

[73] Assignee: The United States of America as represented by the Secretary of the Navy, Washington, D.C.

[21] Appl. No.: 621,276

[22] Filed: Mar. 25, 1996

[51] Int. Cl.$^6$ .................................................. G01M 15/00
[52] U.S. Cl. ........................... 73/115; 73/35.12; 73/118.1; 73/119 A; 73/714; 73/756; 73/726
[58] Field of Search .................... 73/115, 116, 117.2, 73/117.3, 118.1, 119 A, 714, 756, 726, 727, 35.01, 35.03, 35.07, 35.12, 35.13

[56] References Cited

U.S. PATENT DOCUMENTS

| | | | |
|---|---|---|---|
| 2,873,341 | 2/1959 | Kutsay | 201/63 |
| 3,201,977 | 8/1965 | Kutsay | 73/88.5 |
| 3,365,689 | 1/1968 | Kutsay | 338/5 |
| 3,599,479 | 8/1971 | Kutsay | 73/88.5 R |
| 3,695,096 | 10/1972 | Kutsay | 73/88.5 R |
| 3,724,575 | 4/1973 | Kutsay | 177/211 |
| 4,203,318 | 5/1980 | Yorgiadis | 73/141 A |
| 4,283,941 | 8/1981 | Kutsay | 73/862.66 |
| 4,326,423 | 4/1982 | Hartemann | 73/861.63 |
| 4,364,280 | 12/1982 | Kutsay | 73/862.66 |
| 4,416,163 | 11/1983 | Yorgiadis | 73/862.65 |
| 4,453,422 | 6/1984 | Yorgiadis | 73/862.66 |
| 4,483,181 | 11/1984 | Maekawa et al. | 73/714 |
| 4,566,316 | 1/1986 | Takeuchi | 73/115 |
| 4,646,563 | 3/1987 | Jones | 73/119 A |
| 4,753,109 | 6/1988 | Zabler | 73/115 |
| 4,766,655 | 8/1988 | Hickox | 73/727 |
| 4,775,816 | 10/1988 | White et al. | 73/119 A |
| 4,898,024 | 2/1990 | Takeuchi | 73/115 |
| 4,909,071 | 3/1990 | Amano et al. | 73/115 |
| 4,969,352 | 11/1990 | Sellnav | 73/115 |
| 4,969,353 | 11/1990 | Steinke | 73/115 |
| 5,095,741 | 3/1992 | Bartig et al. | 73/115 |
| 5,142,914 | 9/1992 | Kusakabe et al. | 73/115 |
| 5,187,985 | 2/1993 | Nelson | 73/727 |
| 5,323,643 | 6/1994 | Kojima et al. | 73/115 |
| 5,419,199 | 5/1995 | Araki | 73/727 |
| 5,581,019 | 12/1996 | Minor et al. | 73/115 |

OTHER PUBLICATIONS

Cruise, W.B., "Strain Gaging Studs for Saturn," ISA Journal, Dec. 1963, pp. 70–71.
"Strainsert Custom Load–Sensing Bolts and Studs," Bulletin 361–8.
"Strainsert Standard Internally Gaged Studs," Bulletin 364–4.
Yorgiadis, Alex, "Strainsert Force Sensing Fasteners: Their Performance as Transducers and in Bolted Assemblies," Strainsert Project D–217, Aug. 1987.

(List continued on next page.)

*Primary Examiner*—George M. Dombroske
*Attorney, Agent, or Firm*—Howard Kaiser

[57] ABSTRACT

A nonintrusive diesel engine cylinder pressure transducer includes a congruously shaped fuel injector stud which has been internally instrumented with full-bridge electrical resistance strain gage circuitry. The instrumented fuel injector stud has a hole which has been bored axially lengthwise and a full Wheatstone bridge strain gage unit which has been situated in the hole. While the engine is running, the operative instrumented fuel injector stud, which has been replaced in its normal position in the fuel-injector/cylinder assembly, acts in combination with other assembly components as a cylinder pressure transducer. Measurements of tension and compression of the stud are provided which are reflective of pressure, mainly due to compression and combustion, in the engine cylinder. The full-bridge configuration eliminates bending effects and affords electrical temperature compensation. Practice of this invention advantageously avails existing structure. The present invention involves no structural impairment and therefore risks none of the concomitant deleterious mechanical effects, thus obviating the conventional need to compromise the structural and functional integrity of the diesel engine in order to measure cylinder pressure.

20 Claims, 3 Drawing Sheets

OTHER PUBLICATIONS

Verhoef, Bill, "A New Insight into Reciprocating Machinery," Tektronix, Inc., 1969.

"Strainsert Internally Gaged Bolt and Stud: Typical Calibration Performance," Bulletin 362–3.

"Strainsert Load Calibration Service,"Bulletin 362–G.

"Full Bridge Trim and Compensation Resistance Connector Pin Identification and Cable Color Code," Strainsert Form S–113B.

"Saturn Rocket Uses Studs with Internal Strain Gages," Strainsert Pointer BSP–1.

"Load Measurements Made with Internally Gaged Studs Eliminate Friction Error," Strainsert Pointer BSP–2.

"Internally Gaged Piston Measures Axial Loads on Test Specimens under 1000,000 psi Hydrostatic Pressure," Strainsert Pointer BSP–3.

"Axles with Internal Shear Gage Installation Measure Floor Roller Loads," Strainsert Pointer BSP–4.

"Internally Gaged Load Sensing Clevis Pins Used in Syncrolift Marine Elevator to Weigh Ships up to 60,000 Ton Dwt.," Strainsert Pointer BSP–5.

"Internally Gaged Studs Measure Loads in Hang Gliders," Strainsert Pointer BSP–6.

"Internally Gaged Threaded Stud Used as Load Sensor in Electronic Scale Kit for Lift Trucks," Strainsert Pointer BSP–7.

"Notes on Strainsert Internally Gaged Load Sensing Clevis Pins for Pacific Scientific Shock Arresters," strainsert Pointer BSP–8.

"Lena Guyed Tower Features," Strainsert Pointer BSP–9.

METHOD AND APPARATUS FOR MEASURING DIESEL ENGINE CYLINDER PRESSURE

The invention described herein may be manufactured and used by or for the Government of the United States of America for governmental purposes without the payment of any royalties thereon or therefor.

BACKGROUND OF THE INVENTION

The present invention relates to methods and apparatuses for determining pressure in mechanical elements, more particularly to lo methods and apparatuses for determining pressure in cylinders of internal combustion engines.

It is an inevitability for machines of many kinds that parts wear and fail. With regard to internal combustion engines such as gasoline engines and diesel engines, it is generally considered expedient practice to periodically measure the dynamic operating pressure existing inside each engine cylinder for purposes of individually ascertaining cylinder efficiency and especially for purposes of identifying worn or failed components which may be causing cylinder pressure deficiency.

The class of internal combustion engines which effectuates "compression ignition" for igniting fuel to drive a piston in an engine cylinder is commonly known as the diesel engine. A four-stroke diesel engine uses a fuel injecting device (e.g., a fuel injector) for introducing fuel into an engine cylinder after commencement of the compression stroke, thus availing the heat of compressed air to ignite the fuel, the air having been introduced into the engine cylinder before commencement of the compression stroke.

The diesel engine is basically distinguishable from another class of internal combustion engines, commonly known as the gasoline engine, which effectuates "spark ignition" for igniting fuel to drive a piston in an engine cylinder. A four-stroke gasoline engine uses an ignition sparking device (e.g., a spark plug) for igniting, after commencement of the compression stroke, a mixture of air and fuel which has been introduced into the engine cylinder before commencement of the compression stroke.

The dichotomy between diesel engines and gasoline engines was more profound in earlier, simpler versions of these engines; generally speaking, a diesel engine would not use an ignition sparking device, and a gasoline engine would not use a fuel injecting device. However, more recent times have seen various engines of greater complexity which are deemed to be of either the "diesel" type or the "gasoline" type but which in actuality are "hybridized" in the sense of having indicia both of compression ignition and spark ignition.

Conventional techniques for measuring the pressure generated by compression and combustion (firing) within a diesel engine cylinder generally involve the installation of a pressure transducer directly into the cylinder. The pressure transducer is usually of a kind which implements a piezoelectric crystal. Typically, a hole is bored through the cylinder head or block and a piezoelectric "pickup" device is inserted as nearly as possible to the interior of the cylinder, thereby seeking to reduce the damping effects upon the dynamic pressure signal.

Hence, conventional approaches to measuring in-cylinder pressures for a diesel engine are intrusive; i.e., they are penetrative or perforative with respect to the diesel engine. Such instrusiveness frequently carries deleterious ramifications for the diesel engine. Structural modification via the drilling of a hole into the engine head or block to accomodate a transducer will tend to produce a stress concentration or stress riser in the vicinity of the hole, which in turn may significantly reduce the fatigue life of the engine and increase the likelihood of premature engine failure.

Moreover, practice of conventional diesel cylinder pressure transducing methodology is frequently problematical. In many contexts the diesel engine head or block is inaccessible, or not readily accessible, for accomplishing the requisite aperturing for transducer installation; under some circumstances, more elaborate structural modification of the diesel engine is required to render such installation attainable.

Electrical resistance strain gaging is well known and has been practiced for a variety of applications, but its practice in connection with measuring internal combustion engine cylinder pressure has not been observed by the inventor. Of particular interest herein is disclosure in the art of the internal installation of one or more electrical resistance strain gages in mechanical objects such as fasteners.

Kutsay U.S. Pat. No. 2,873,341, issued 10 Feb. 1959, incorporated herein by reference, discloses placement of an electrical resistance strain gage in a small central hole ("bore") drilled along the longitudinal axis of an elongated body (such as a bolt) which is subjected to longitudinal compression or extension, with the intention of measuring the extent of such longitudinal tension (extension) or compression, using the elongated body as an electrical strain gaging device. A single wire electrical resistance strain gage unit is fit into the hole so as to measure body tension or compression while eliminating bending effects. Kutsay '341 teaches various orientations of the wire in the hole, and teaches various methods of insertion, placement and attachment of the wire therein.

Also incorporated herein by reference regarding strain gage technology are Kutsay U.S. Pat. 4,364,280; Kutsay U.S. Pat. No. 4,283,941; Kutsay U.S. Pat. No. 3,724,575; Kutsay U.S. Pat. No. 3,695,096; Kutsay U.S. Pat. No. 3,599,479; Kutsay U.S. Pat. No. 3,365,689; Kutsay U.S. Pat. No. 3,201,977; Yorgiadis U.S. Pat. No. 4,453,422; Yorgiadis U.S. Pat. No. 4,416,163; Yorgiadis U.S. Pat. No. 4,203,318; and, Cruise, W. B., "Strain Gaging Studs for Saturn," *ISA Journal*, Dec. 1963. Strain gage technology has advanced in the years since Kutsay's disclosure at '341 in 1959. These references, in general, reveal that multi-wire electrical resistance strain gage units have been considered for various applications involving load or force transducing. In particular, the more recent state of the art has seen the advent of a full Wheatstone bridge ("full-bridge") strain gage configuration for some applications.

One business entity of note which has practiced internally installed strain gaging technology is Strainsert Company of Union Hill Industrial Park, West Conshohocken, Pa. Strainsert specializes in bonding and sealing electrical resistance foil-type strain gage circuits inside small holes of fasteners (such as bolts and studs) for measuring loads induced in the fasteners. Strainsert publishes and catalogs bulletins, brochures, supplements, price schedules, etc. which include informative technical information about their products.

Noteworthy among Strainsert's publications are "Strainsert Custom Load-Sensing Bolts & Studs" Bulletin #361-8 and "Strainsert Standard Internally Gaged Studs" Bulletin #364-4, both of which make reference to the above-mentioned U.S. Pat. No. 2,873,341 to Kutsay and thereby acknowledge the technological underpinnings provided thereby. Also pertinent herein are Yorgiadis, Alex, "Strainsert Force Sensing Fasteners: Their Performance as Transducers and in Bolted Assemblies," Strainsert Project D-217, August 1987; "Strainsert Internally Gaged Bolt & Stud: Typical Calibration Performance" Bulletin 362-3; and, "Strainsert Load Calibration Service" Bulletin 362-G.

Strainsert advertises that its fasteners such as bolts and studs are available in many shapes, that its fasteners can be used as force transducers, that its internal gage installations are superior to external gage installations in terms of environmental and mechanical ruggedness, that each bolt or stud has full load-carrying capacity, that the built-in strain gage for a bolt or stud is available in either quarter-bridge or full-bridge gage configuration, and that bending and torque are compensated for by the gage configuration. For example, Strainsert Bulletin #361-8 states, inter alia, the following:

... Bolts with Strainsert internal gage installations have the full load carrying capacity of the original ungaged bolt. Cross-sectional area of the threaded portion of a full shank bolt is always smaller than the cross-sectional area of the shank. The difference in areas permits a hole to be drilled in the shank for the gage installation without weakening the bolt .... Gages installed in Strainsert Bolts and Studs are foil type, electric resistance strain gages. They are bonded and sealed in a small hole along the longitudinal neutral axis of the bolt. The hole is then filled with an inert plastic material. After installation the gages are practically immune to physical, chemical and environmental damage. Internal gage installations by Strainsert are as good as the very best external gage installations. The patented installation technique conforms to the best recommendations of gage and cement manufacturers. Actually there are reasons to expect the performance of an internal gage installation to be superior to conventional external installations. For one thing, gages in a full-bridge internal installation are located very close to each other and are bound to be in a uniform temperature environment .... Quarter-bridge installations consist of two gages mounted 180 degrees apart on the circumference of the hole with the grid in an axial direction. This arrangement provides the best indication of bolt load and also helps compensate for bending and torque. To eliminate lead-wire temperature effects, a three-wire lead system is used. Trim resistors or other compensations are not furnished with quarter-bride gage installations. Full-bridge internal gage installations are made in the same size holes as for quarter-bridge. They are wired as shown with axial active gages and circumferential complementary gages. Trims and compensations are offered only if there is room for the necessary components .... When structures are joined together by tightening or "torquing" a bolt or a stud, a tension force is induced in the shank of the fastener. This tension force causes a compressive or clamping force on the joined members. In the absence of other external forces, this clamping force is exactly equal to the tension in the bolt or stud. Thus, a load sensing fastener will provide very accurate measure of such clamping force .... For proper performance the gage installation in a bolt should be below the head in the unthreaded section of the shank. This is the point where strain is most representative of bolt load ....

SUMMARY OF THE INVENTION

In view of the foregoing, it is an object of the present invention to provide diesel engine cylinder pressure measurement method and apparatus which do not incur significant risk of adversely affecting diesel engine operation or longevity.

It is a further object of this invention to provide such method and apparatus which are practicable and effective virtually regardless of the characteristics of the diesel engine.

The present invention uniquely provides method and apparatus for nonintrusively measuring the pressure inside an internal combustion engine cylinder. The inventive method and apparatus are feasible and efficacious not only for most types of diesel engines but also for many other engine varieties of hybridized, complex or extraordinary internal combustion design.

In an internal combustion engine of a type having at least one combination of a cylinder, a nozzle for introducing fuel into said cylinder, and a plurality of fasteners for fixing said nozzle with respect to said cylinder, the inventive apparatus for transducing pressure in a cylinder comprises a strain gage unit which is coupled with a fastener so as to be indicative of the pressure, and the inventive method for transducing pressure in a cylinder comprises coupling a strain gage unit with a fastener so as to be indicative of the pressure.

According to most preferred embodiments of this invention, a strain gage unit is installed internally in an ordinary fastener, which thereby becomes an internally instrumented fastener. This invention thus nonimpairingly incorporates a strain gage unit into a fuel injector/cylinder assembly and succeeeds in obviating the conventional need to undertake structural modification in order to accomodate a pressure transducer.

In accordance with typical inventive embodiments involving internal strain gaging installation, electrical resistance strain gages are located within a fuel injector stud so as to, in combination with certain surrounding diesel engine structure, effect a force transducer. More specifically, the strain gages are located within a bore defining a portion of the longitudinal axis of the fuel injector stud. When appropriately in place in the injector/cylinder assembly, the inventively instrumented fuel injector stud measures forces which are being transferred therethrough and which are being caused by pressure in the engine cylinder. The inventively instrumented stud can be calibrated to measure cylinder pressure directly.

The present invention features adaptation of an ordinary fuel injector stud so as to become an instrumented fuel injector stud, and further features normal placement of the instrumented fuel injector stud in the diesel engine's injector/cylinder assembly so as to, along with with other structure of the injector/cylinder assembly, integratively effectuate a cylinder pressure transducer. This invention thus represents a novel alliance of technologies pertaining to internal combustion engines and electrical resistance strain gages.

Most embodiments of the present invention preferably utilize four small foil strain gages which are disposed and wired, in the bore of a fuel injector stud, as a full Wheatstone bridge. The full-bridge strain gage configuration measures stud tension and compression and eliminates bending effects. In addition, the full-bridge strain gage configuration affords electrical temperature compensation; due to the close proximity of the four gages in the full bridge, changes in temperature are, for all intents and purposes, equal for all four gages.

The cylinder pressure transducer according to this invention thus includes what is descriptively referred to herein as an instrumented fuel injector stud. In the inventive practice the instrumented fuel injector stud structurally replaces an ordinary (i.e., non-instrumented) fuel injector stud. The instrumented fuel injector stud corresponds to an existing fuel injector assembly of a diesel engine cylinder.

Installation of strain gaging in a fuel injector stud according to this invention can be accomplished either via modification or from scratch. According to some embodiments of this invention, the instrumentation may be incorporated within an ordinary, previously fabricated, conventionally non-instrumented fuel injector stud; according to other embodiments, an instrumented fuel injector stud of desired dimension and shape may be fabricated as a unit.

For most applications the inventive pressure transducer is used for monitoring cylinder pressure caused by compression and firing. The electrical resistance strain gages measure strain produced by pressure in the diesel engine cylinder. This pressure signal, in conjunction with a crankshaft position indicator (e.g., piston top dead center), may be used to construct pressure-volume ("P-V") diagrams, from which indicated work and horsepower can be calculated. Instructive on engine performance evaluation and in particular on P-V diagrams is Verhoef, Bill, "A New Insight into Reciprocating Machinery," a seven page article published by Tektronix, Inc. in 1969 and incorporated herein by reference.

The U.S. Navy was desirous of testing the inventive system for non-intrusively acquiring cylinder compression/firing pressure measurements. Comparative testing was conducted of inventive nonintrusive transducers versus conventional intrusive transducers to determine if the inventive nonintrusive transducers were capable of providing, from engine component locations external to the cylinders, signals which were acceptably relatable to internal cylinder pressures.

In an earlier trial, the diesel engine in the test cell was a "V" six-cylinder diesel engine, Model 2894F01, manufactured by Isotta Fraschini Company. Requests for information about the Isotta Fraschini diesel engine should be directed to the U.S. Navy, Naval Sea Systems Command; the Technical Manual for Isotta Fraschini Diesel Engine Model 2894F01 is designated Navy publication S9233-B9-MMM-010.

Strainsert Company was contracted by the U.S. Navy to perform the modification of two studs so as to become two prototypical instrumented studs, each of which became part of a separate inventive pressure transducer. Strainsert imbedded a full bridge of strain gages into a small hole drilled lengthwise into the stud axis for each of two fuel injector studs taken from the Isotta Fraschini six-cylinder diesel engine.

Each of the two inventive instrumented fuel injector studs was situated and tested at one of two cylinders of the Isotta Fraschini diesel engine; one inventive instrumented stud prototype was associated with the third right cylinder and the other inventive instrumented stud prototype was associated with the first left cylinder. In addition, parallel testing was performed for two piezoelectric pressure transducers. Each of the two piezoelectric pressure transducers was intrusively located, in a conventional manner, at one of the same two cylinders. As generally necessitated by conventional diesel engine cylinder pressure measurement technique, the Isotta Fraschini diesel engine was specially apertured to accept the two intrusive piezoelectric pressure transducers in the two cylinders.

The Isotta Fraschini diesel engine was put through a series of tests at various speeds and torques, and data were acquired at several points. The signals from the two inventive strain gage pressure transducers were compared with the signals from the two piezoelectric pressure transducers at their respective cylinders; these comparisons were graphically illustrated by pressure-versus-time traces which were generated for each inventive pressure transducer and each piezoelectric pressure transducer during these trials.

Good correlation of testing results between those for the two different types of transducers was achieved; the signals from the instrumented studs of the inventive pressure transducers compared favorably with the signals from the piezoelectric pressure transducers. Any appreciable differences were considered anomalous and insignificant.

The differences observed in the tests were attributed to response by the inventively instrumented studs to, aside from their response to the internal cylinder pressures, the resonant vibrations of the fuel lines attached to the fuel injectors and the high pressure pulses of the fluid within those fuel lines. Data were recorded at idle which demonstrated a comparison between the normal signals, and an attempt was made to dampen the vibration in the fuel lines by holding the fuel lines. The piezoelectric transducer signals were also showing the effects of their crystals in resonance, riding on the generated signals corresponding to the internal cylinder pressures.

The comparisons of the signals from the two different types of transducers, with the above-noted exceptions, establish sufficient equivalence therebetween; demonstrably, sufficient definition exists in the signal from the inventively instrumented stud to use it as an integral part of the inventive diesel engine cylinder pressure transducer. Based on the data obtained, it may be concluded that instrumenting an injector hold-down stud with a full bridge of strain gages in accordance with the present invention, and conditioning and interfacing its signal with a load, strain or force transducer data acquisition system (e.g., one which employs a suitable, commercially available indicator, oscilloscope or recorder) in accordance with known technique, does indeed provide a viable methodology for non-intrusively measuring internal cylinder pressure, including compression pressure and firing pressure, for an internal combustion engine such as a diesel engine.

The present invention advantageously succeeds in measuring dynamic in-cylinder pressures in diesel engines without requiring the drilling of an access hole into a head or block, or otherwise damaging a head or block, in order to locate a pressure transducer. When an access hole is drilled in accordance with the conventional pressure measurement methodology, whereby a pressure transducer is placed directly into the head or block, this quite often weakens the head or block, thereby increasing risk of engine failure; sometimes, in fact, lack of accessibility renders conventional methodology impracticable.

In practicing the present invention, by contrast, there is no structural damage (e.g., boring of an additional hole to accomodate a pressure transducer) which is necessitated by the effort to measure internal diesel cylinder pressure. Instead, according to this invention, an existing design aperture for a fuel injector stud is engaged by a compatible fuel injector stud which is made to include strain gaging means; the diesel engine is left essentially intact.

Moreover, structural stress analyses performed by the U.S. Navy on instrumented stud prototypes have shown that, within acceptable limits, the inventively instrumented fuel injector stud is stress-resistant/tolerant during engine operation. The likelihood of fatigue failure associated with the instrumented fuel injector stud in its normal non-instrumented usage is minimal; even if such fatigue failure were to occur, it would be expected that the stud could merely be replaced without damage to the engine itself having been caused.

Furthermore, the present invention is not subject to the diversities and vagaries among diesel engines of multifarious structural designs. Since fuel injectors and their stud fasteners are, regardless of diesel engine design, normally found ancillary to diesel engine cylinders, the present invention should be practicable for the vast majority of diesel engines.

Other objects, features and advantages of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein.

DETAILED DESCRIPTION OF THE INVENTION

Typically, a diesel engine fuel injector has two supporting fuel injector studs. For each cylinder of the diesel engine for which internal pressure is to be monitored in accordance with this invention, the fuel injector is removed and one of the two supporting fuel injector studs is replaced with a fuel injector stud which has been instrumented with a strain gage unit. The fuel injector is then reinstalled. Instrumentation of more than one stud per cylinder is not necessary; practice of this invention requires instrumentation of only one fuel injector stud for each cylinder to be pressure-monitored.

Figure 1:
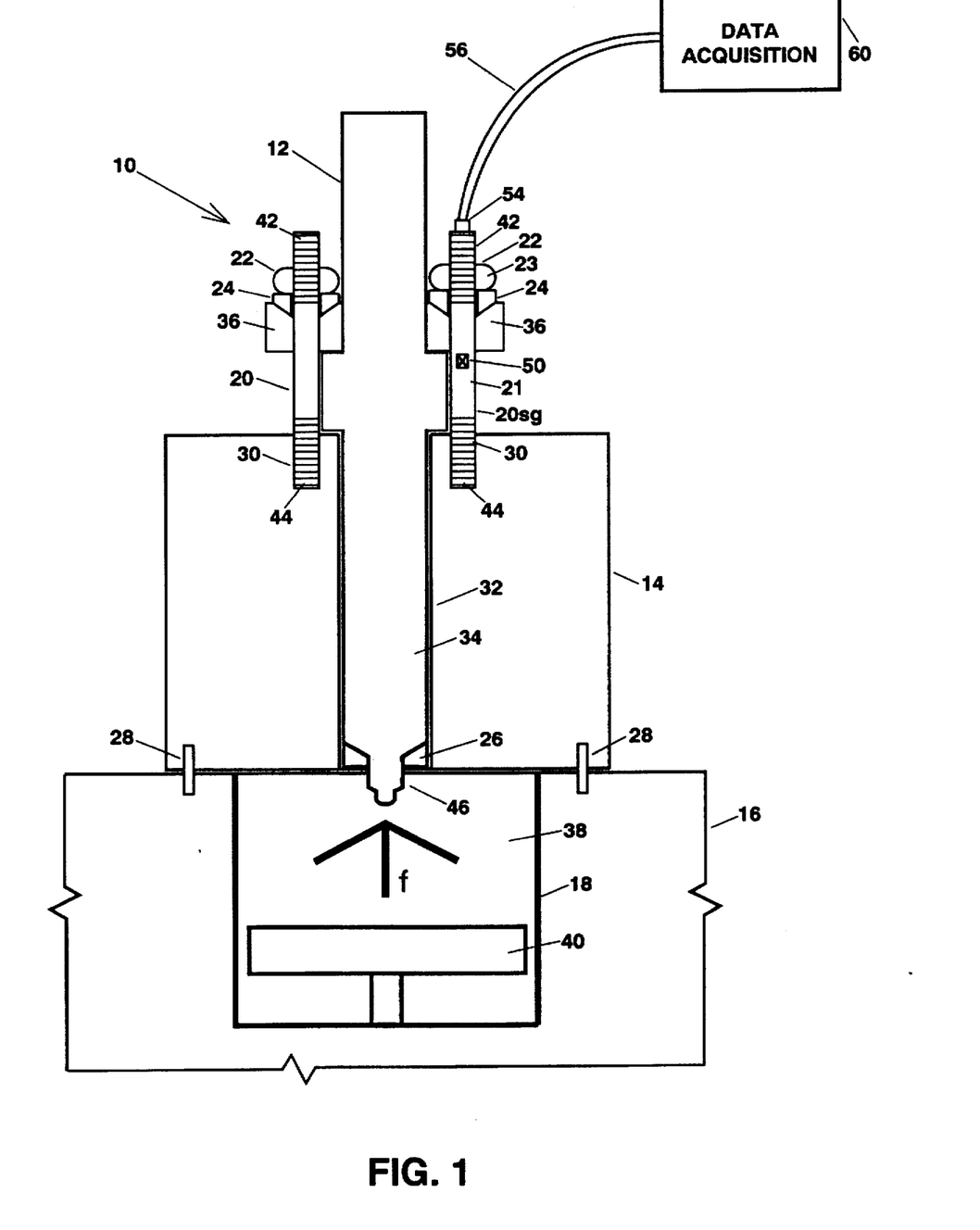
FIG. 1 is a schematic diagram of a preferred embodiment of a strain measurement-based cylinder pressure transducing system in accordance with the present invention, said schematic diagram including a partial elevated diagrammatic view (with some portions removed to show interior detail) of a diesel engine injector/cylinder assembly which effectuates a cylinder pressure transducer in accordance with the present invention.

Referring now to FIG. 1, diesel engine fuel injector/cylinder assembly 10 includes fuel injector 12, cylinder head 14, cylinder block 16, cylinder 18, regular (non-instrumented) fuel injector stud 20, internally instrumented fuel injector stud 20sg, two fuel injector stud nuts 22, two beveled fuel injector stud washers 24, nose gasket 26 and a plurality (two shown) of head bolts 28. The mechanical rudiments shown in fuel injector/cylinder assembly 10 are fairly representative for a diesel engine, the notable exception being that the companion fuel injector stud to non-instrumented fuel injector stud 20 has been replaced according to this invention with internally instrumented fuel injector stud 20sg.

Head 14 has two interiorly threaded apertures 30 (for receiving exteriorly threaded fuel injector studs) and through-sleeve 32 (for holding a fuel injector nozzle). Head 14 is bolted to block 16 via head bolts 28. Fuel injector 12 includes fuel injector nozzle 34 (vertical as shown in FIG. 1) and cross piece 36 which, together, roughly form a "t" shape. Cross piece 36 is apertured in its lateral projections for permitting studs 20 and 20sg at opposite sides to pass therethrough, and is medially sleeved for permitting fuel injector nozzle 34 to pass therethrough and be held in place. Cylinder 18 includes internal combustion chamber 38 and piston 40.

Block 16 is a large casting housing which contains the engine cylinders. Injector/cylinder assembly 10 is autonomous but for the fact that cylinder 18 and its corresponding head 14 share block 16 with other cylinders and their corresponding heads. A segment of block 16 is shown to contain cylinder 18; not shown is the rest of block 16, wherein other cylinders like cylinder 18 are similarly contained, each of which cylinder is similarly part of an essentially independent injector/cylinder assembly like injector/cylinder assembly 10.

Studs 20 and 20sg engage nuts 22 and apertures 30 so as to support fuel injector 12 in head 14. Injector nozzle 34 fits neatly within sleeved through-opening 32 of head 14. Injector nozzle 34 has nose 46, which protrudes slightly into chamber 38 of cylinder 18 for purposes of injecting fuel. Each of stud 20 and stud 20sg has an upper exteriorly threaded stud portion 42 and a lower exteriorly threaded stud portion 44. Each upper exteriorly threaded stud portion 42 engages an interiorly threaded mated nut 22. Each lower exteriorly threaded stud portion 44 engages an interiorly threaded mated head aperture 30. Nuts 22 on studs 20 and 20sg have each been torqued to a specified value which highly preloads studs 20 and 20sg in tension. In addition, injector nozzle 34 applies a compression loading to gasket 26.

When the diesel engine is in operation, the preloaded studs 20 and 20sg experience changes in loading due to, and commensurate with, changes in pressure below nose 46 in chamber 38. In accordance with this invention, these changes in pressure are detected by monitoring changes in strain in stud 20sg. Thus is effected a transducer which measures changing pressure in chamber 38.

While not wishing to be bound by theory, a primary vectorial force mode can be described which appreciably manifests changing loadings on stud 20sg which are a function of changing pressures in chamber 38. This primary dynamic force path manifests changing loadings on stud 20sg which proportionately vary with the changing pressures in chamber 38.

As piston 40 moves back-and-forth (up-and-down as shown in FIG. 1) in chamber 38, changes in pressure occur in chamber 38 which cause a force to be exerted in a direction f which is generally upward as shown in FIG. 1. Force f is exerted upward against nose 46, approximately in the direction of the longitudinal axis of injector nozzle 34; this exertion of force f results in reduction of compression of gasket 26 and the pushing upward of injector nozzle 34. This generally upward force f thus exerts itself upon the structure of injector-cylinder assembly 10, with the resultant primary force path being transmitted through injector-cylinder assembly 10. The consequence of this primary force path is increased loading upon stud 20sg.

Hence, injector-cylinder assembly 10 in a sense can be considered to be acting as a mechanical system of three springs in virtual parallel which serve to measurably increase tension of studs 20 and 20sg. The middle spring is approximately defined by the compressed gasket 26. The left spring is approximately defined by the pretensioned portion of stud 20. The right spring is approximately defined by the pretensioned portion of stud 20sg. The two injector studs 20 and 20sg having been pretensioned and gasket 26 having been pre-compressed, injector-cylinder assembly 10 is in a state of mechanical equilibrium when the engine is in a state of inactivity.

When the engine is activated, the three springs synchronously "spring" into action. The upward extension (relaxation) of the middle spring (gasket 26) corresponds to the upward pushing upon nozzle 34. The upward extension of the left spring corresponds to the upward stretching of stud 20. The upward extension of the right spring corresponds to the upward stretching of stud 20sg.

For some embodiments, a secondary vectorial force mode can also be identified; i.e., a secondary dynamic force path may be significantly manifested in addition to the primary force path. Pursuant to this secondary force path, the upward exertion of force f against head 14 results in the convexly upward bulging of head 14, thus producing a diaphragm-like or "oil canning" effect. The degree of this oil-canning effect is a function of the characteristics of head 14 in terms of its material composition and dimensions (especially its thickness in the direction of arrow f shown in FIG. 1). In practice of this invention, it is believed that the properties of the head for many embodiments can be expected to render such an oil-canning effect negligible or virtually nonexistent.

In theory, at least, oil-canning curvature of head 14 causes downward extension of the left and right springs. Oil-canning of head 14 causes downward extension of the left spring corresponding to downward stretching of stud 20; this downward stretching of stud 20 caused by the secondary force path is cumulative to the upward stretching of stud 20 caused by the primary force path. Similarly, oil-canning of head 14 causes downward extension of the right spring corresponding to downward stretching of stud 20sg; this downward stretching of stud 20sg caused by the secondary force path is cumulative to the upward stretching of stud 20sg caused by the primary force path.

Accordingly, when both a primary force path and a secondary force path are acting in unison, these two distinct dynamic force paths additively combine to reflect changing loadings on stud 20sg which are functionally indicative of changing pressures in chamber 38. Each force path separately manifests changing loadings on stud 20sg which proportionately vary with the changing pressures in chamber 38.

Figure 2:
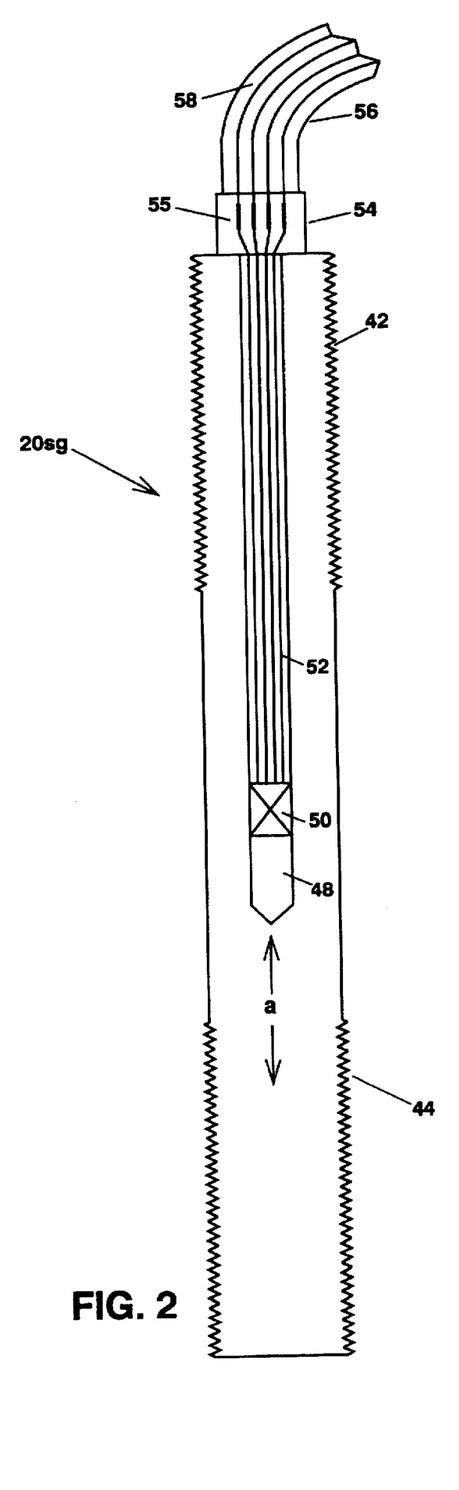
FIG. 2 is an enlarged, cross-sectional diagrammatic elevated view of an embodiment of the internally strain gaged fuel injector stud shown in FIG. 1.

Still with reference to FIG. 1 and also with reference to FIG. 2, small diameter hole 48 has been drilled along longitudinal neutral axis a of stud 20sg. Wheatstone bridge strain gage unit 50 (represented by an "X") comprises four foil-type electrical resistance strain gages which have been bonded and cemented/sealed inside hole 48, which has subsequently been filled with an inert plastic material.

It is preferable inventive practice that the strain gage unit be situated medially within the instrumented stud's longitudinal portion which experiences tensile loading when the instrumented stud is in place in the engine. The stretched portion of stud 20sg, particularly referring to FIG. 1, is the intermediate portion between the location just below where stud nut 22 begins to engage upper exteriorly threaded stud portion 42 and the location just above where interiorly threaded aperture 30 begins to engage lower exteriorly threaded stud portion 44. Wheatstone bridge strain gage unit 50 is shown located at the approximate longitudinal midpoint of the stretched portion of stud 20sg. Such midway positioning of the strain gage unit serves to minimize the introduction of "end effects" which will become increasingly manifest in correspondence with increased proximity of the strain gage unit to either "end" of the instrumented stud's stretched portion.

Internally gaged stud 20sg includes Wheatstone bridge strain gage unit 50, longitudinal stud wires 52 and connector 54. connector 54 is made an integral part of stud 20sg. Connector 54 has terminal pins 55 and is connected via cable 56, which has cable wires 58, to force/strain/load transducer data acquisition apparatus 60. Four stud wires 52 lead in one-to-one correspondence to four terminal pins 55 from strain gage unit 50. In turn, four cable wires 58 lead in one-to-one correspondence from four terminal pins 55 to data acquisition apparatus 60.

Two of the stud wire 52/terminal pin 55/cable wire 58. connections are for inputting voltage from data acquisition apparatus 60 to strain gage unit 50, and two of the stud wire 52/terminal pin 55/cable wire 58 connections are for outputting voltage from strain gage unit 50 to data acquisition apparatus 60. Data acquisition apparatus 60 includes direct current (DC) power supply 60a, amplifier 60b, processor 60c and display/recorder 60d.

Data acquisition apparatus 60 applies a DC voltage across the strain gage unit 50 bridge and receives output voltage signals from strain gage unit 50. The signals sent by strain gage unit 50, in effect, are derived from the right spring action which reflects the loading changes on stud 20sg which proportionately vary with the changing pressures in chamber 38 of cylinder 18.

Data acquisition apparatus 60 amplifies and then processes the output voltage signals, and finally manifests (i.e., displays and/or records) measurement information based on these signals. For some embodiments data acquisition apparatus 60 includes an oscilloscope which performs a pressure-time trace. The output voltage signal received from strain gage unit 50 (and therefore the output voltage information displayed by data acquisition apparatus 60) is proportional to the pressure in chamber 38 of cylinder 18.

Figure 3:
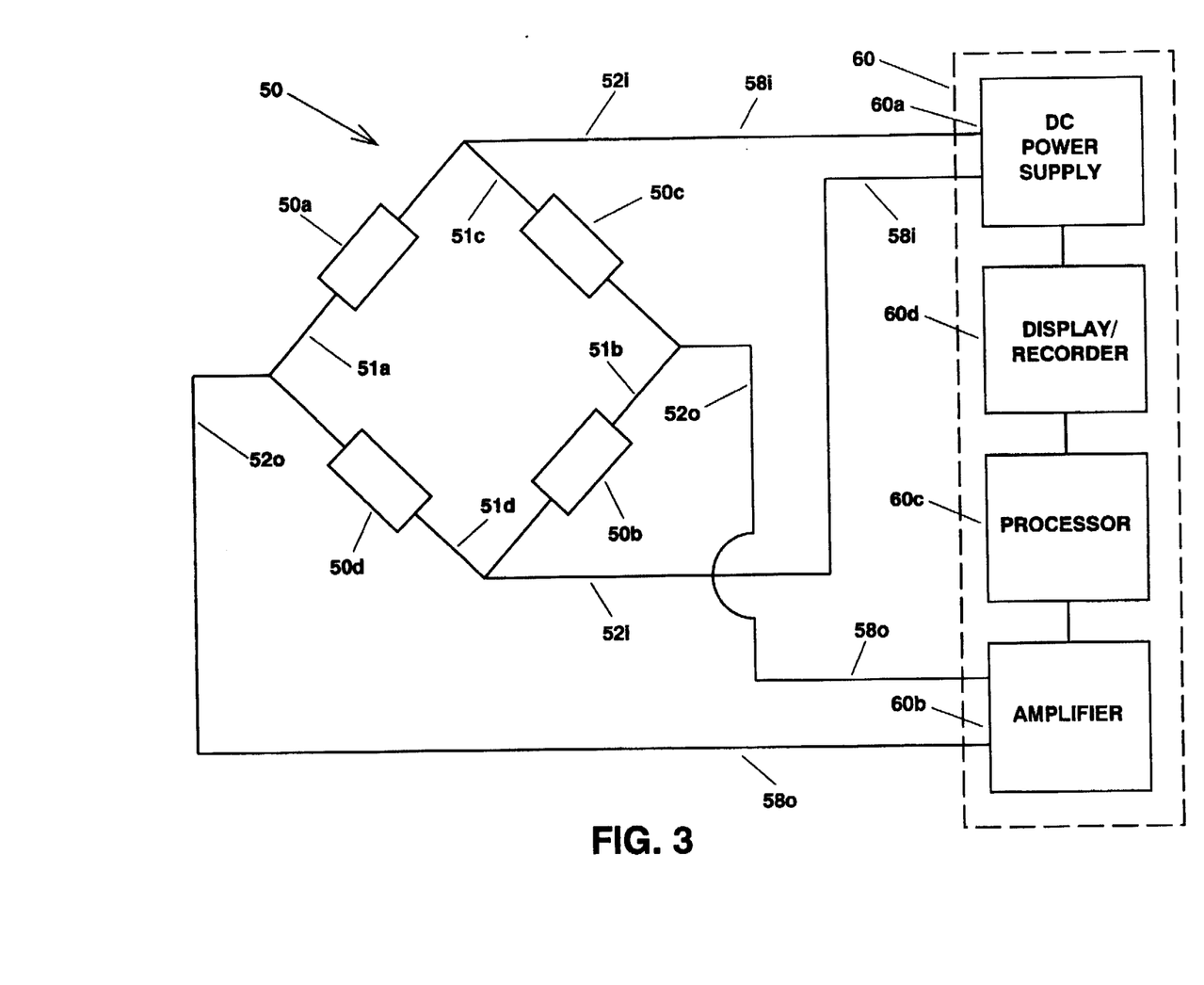
FIG. 3 is a basic circuit diagram of the cylinder pressure transducing system shown in FIG. 1.

Reference now being made to FIG. 3, full-bridge strain gage unit 50 comprises strain gages 50a, 50b, 50c and 50d. Inside hole 48 of stud 20sg shown FIG. 1, strain gages 50a and 50b are placed parallel to axis a and opposite each other, and strain gages 50c and 50d are placed perpendicular to axis a and opposite each other. Strain gages 50a and 50b measure small changes in tension of stud 20sg which are caused by changes in pressure within chamber 38. Strain gages 50c and 50d read compressive strain of stud 20sg due to Poisson's effect.

Two cable wires 58i together with the two correspondingly connected stud wires 52i transmit input voltage from data 20 acquisition apparatus 60 to strain gage unit 50; two stud wires 52o together with the two correspondingly connected cable wires 58o transmit output voltage from strain gage unit 50 to data acquisition apparatus 60.

When strain gages 50a, 50b, 50c and 50d are wired as shown into a full Wheatstone bridge having four active arms 51a, 51b, 51c and 51d, respectively, the inventive pressure transducer provides about 2.6 times the output that would be provided if strain gage 50a and/or strain gage 50b were wired in a quarter-bridge configuration. In addition, when the four strain gages are wired as a full active Wheatstone bridge, temperature compensation is achieved to minimize thermal drift.

In accordance with most embodiments of this invention, at least two strain gages, configured in one of various ways, are preferably used for a stud so as to provide compensation for the stud's bending. For example, two strain gages can be wired in a quarter-bridge configuration or four strain gages can be wired in a full-bridge configuration. Half-bridge and full-bridge configurations inherently afford temperature compensation by virtue of the operation of the Wheatstone bridge circuit. It is contemplated that other strain gage configurations can be used for given embodiments in accordance with the principles of this invention.

Previously incorporated herein by reference is U.S. Pat. No. 3,365,689 to Kutsay, wherein Kutsay discloses inclusion, in the Wheatstone bridge circuit, of special resistance elements (such as temperature compensation resistors, zero load bridge balance trim resistors, output signal adjusting resistors, elastic modulus compensation resistors, excitation resistance trim resistor and signal resistance trim resistor) for maximum accuracy and to comply with accepted standards. Also incorporated herein by reference are the aforenoted four-page Strainseft Company Bulletin #361-8 (entitled "Strainsert Custom Load-Sensing Bolts & Studs") and the Strainsert Company Form S113B (entitled "Full Bridge Trim & Compensation Resistance Connector Pin Identification & Cable Color Code); of particular note therein are the full-bridge internal gage wiring diagrams. Strainsert Company Bulletin #361-8 (third page) also shows a quarter-bridge diagram. The full-bridge diagrams in Strainsert Company Bulletin #361-8 (third page) and Strainsert Company Form S-113B each illustrate utilization of four types of bridge trim resistors, i.e., resistor types pertaining to initial (zero load) bridge balance, signal trim, modulus trim and (zero load) temperature compensation; two resistors of each resistor type are shown in the full-bridge diagram. In addition, the full-bridge diagram in Strainsert Company Form S-113B illustrates utilization of excitation resistance trim and signal resistance trim, one resistor of each type shown.

Figure 4:
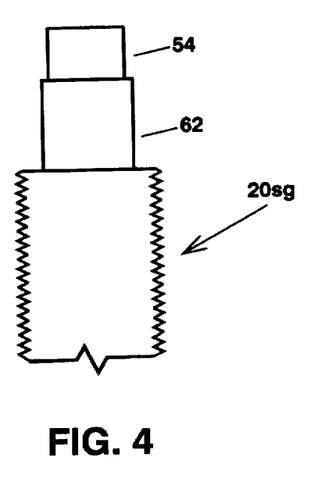
FIG. 4 is an enlarged, partial diagrammatic elevated view of another embodiment of the internally strain gaged fuel injector stud shown in FIG. 1.

For some embodiments it may be preferable to incorporate some or all of the bridge trimming and/or compensating circuitry in a unit such as adapter 62 shown in FIG. 4, which is made an integral part of stud 20sg, adapter 62 being interposed between connector 54 and the end of the original stud part. The instrumented stud used for the aforediscussed Navy testing of the Isotta Fraschini diesel engine similarly incorporated an adapter. The original stud part of the instrumented stud used for Navy testing was made of medium carbon alloy steel, had a small circumferential 45° chamfer at each end, and measured approximately 2.760 inches long by 0.4 inches wide ("M10×1.25P" upper threading and "M10×1.5P" lower threading). Including the adapter and connector, the instrumented stud used for Navy testing was approximately 3.291 inches long. The full-bridge gage circuit (350-ohm) was internally installed near the deep end of a hole which was approximately 1.75 inches deep and approximately 0.15625 inches in diameter.

The internal installation of strain gages is believed by the inventor to provide the most successful inventive approach to extracting strain signals relating to in-cylinder pressures in diesel engines. Internal strain gage installation affords greater convenience, environmental protection and mechanical protection than does external strain gage installation. Internally installed strain gage instrumentation is less likely to be damaged both during and after fuel injector installation; mechanical maintenance of an engine can be conducted without affecting internally installed strain gage instrumentation.

Nevertheless, although this invention is preferably practiced with the strain gage instrumentation installed internally in the fuel injector stud, as exemplified by instrumented fuel injector stud 20sg in FIG. 1, this invention alternatively admits of practice with the strain gage instrumentation installed externally about the fuel injector stud or other fastener component. In accordance with this invention, acceptable signals can be obtained from exteriorly placed strain gages, e.g., from strain gages placed on the outside surface of a fuel injector stud or from strain gages placed on the outside surface of a fuel injector stud nut, provided that the surface to be thus occupied is exposed when the fuel injector is mounted to the head.

Again referring to FIG. 1, non-instrumented fuel injector stud 20, for example, has accessible exterior circumferential stud surface 21, along and about which can be envisioned to be placed a full-bridge strain gage configuration such as represented in FIG. 2. As another option, for example, left fuel injector stud nut 22 has accessible exterior circumferential nut surface 23, along and about which can be envisioned to be placed a full-bridge strain gage configuration such as represented in FIG. 3.

The inventive strain measurement-based cylinder pressure transducing system shown in FIG. 1 thus comprises full-bridge strain gage unit 50, provided internally in stud 20sg, and data acquisition apparatus 60, provided externally with respect to the diesel engine. It is necessary inventive practice in general that, prior to its implementation, the inventive pressure transducing system be calibrated with known cylinder pressures. The inventive pressure transducing system is calibrated by applying, within the cylinder, known pressures as indicated by a secondary device. The secondary device is preferably a standard pressure measuring unit which is equipped with a check valve and a bleed valve.

If the diesel engine cylinder contains an access port with a connecting pipe and shutoff valve, the secondary device is attached and the shutoff valve is opened. While the diesel engine is in operation, the pressure within the cylinder is rapidly changing as the cylinder undergoes the intake, compression, ignition and exhaust parts of the four stroke cycle. The check valve in the secondary device causes a steady increase in pressure on the secondary device until a maximum value is reached; this maximum value is equivalent to the peak firing pressure reached within the cylinder. The gain of the inventive system's fuel injector stud strain gage instrumentation is then adjusted to read the peak firing pressure. The shutoff valve in the cylinder access pipe is then closed and the secondary device bled. The procedure may be repeated for each succeeding cylinder which contains an access port and for which an instrumented fuel injector stud is to be calibrated for cylinder pressure.

If the diesel engine cylinder does not contain an access port which permits attachment of a secondary device to measure cylinder pressure, then a dummy fuel injector nozzle is used for access. Assuming that none of the cylinders contains an access port, all the fuel injector nozzles are removed from the engine and the overall fuel injection system for the engine is rendered inoperative. The following procedure may be followed for each cylinder. The dummy fuel injector nozzle is installed as a regular fuel injector nozzle in the head of the cylinder; the appropriate torque is applied to the nuts corresponding to both the regular and the instrumented fuel injector studs. The secondary device is connected to the dummy fuel injector nozzle. The engine is cranked with the starting motor, and maximum compression pressure is read on the secondary device. As described above for access-ported cylinders, the gain of the inventive system's fuel injector stud strain gage instrumentation is adjusted to read the peak compression pressure. With this procedure, however, as distinguished from the above-described procedure for access-ported cylinders, peak pressure does not include peak firing pressure; peak compression pressure, only, will be reached, because the engine is operating in the intake and compression parts of the cycle, only.

The principles of the present invention are applicable to any internal combustion engine which implements at least one fuel injector-like device toward effectuating ignition of at least one cylinder. Expressed another way, the ordinarily skilled artisan understands, in the light of the instant disclosure, that the present invention encompasses any internal combustion engine which has sufficient and suitable "diesel" character, in terms of structural engagement of a fuel injector-like device and a cylinder, for lending itself to practice of the present invention.

As previously discussed herein, in theory it is believed that a primary force path is associated with the upward pushing upon the nose of the fuel injector nozzle, and that for some embodiments there may be a secondary force path of significance which is associated with oil-canning of the head and which serves to supplement the primary force path. For some types of diesel engines, each cylinder is ignited via compression ignition, has its own fuel injector and has its own cylinder head, and each cylinder head has its own head bolts for fastening it to the cylinder block. For such applications, the efficacy of the inventive practice should be assured regardless of the existence, in addition to the primary force path, of a significant secondary force path.

In other words, where there is a one-to-one correspondence of cylinder to fuel injector and cylinder to head, and there is an independent set of head bolts/studs corresponding to each individual head, strains transmitted to the inventively strain-gaged fuel injector stud are highly likely to be caused by pressure changes within the cylinder upon which the fuel injector is mounted, and not by pressure changes within adjacent cylinders. For such applications, it can be reasonably expected that the yielded pressure-related strains be due to pressure changes within a particular cylinder and be totally or virtually unaffected by pressure changes within adjacent cylinders.

Practice of the present invention should also be efficacious, albeit perhaps more problematical due to head oil-canning, where two or more cylinders share a common head, or where common head bolts secure adjacent individual heads to the block; for such applications, the existence of a secondary force path of consequence may be a complicating factor. If a fuel injector stud were strain-gaged according to this invention in application to an engine wherein a head or heads significantly oil-can, the strain signals therefrom may be indicative of pressure changes occurring in all the cylinders below the head or leads involved; separation of the signals from each cylinder may be more difficult to accomplish.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. In an internal combustion engine, the combination including an engine cylinder, a block for housing said cylinder, a nozzle for introducing fuel into said cylinder, a head for holding said nozzle in relation to said cylinder, a fastening assembly for fixing said nozzle with respect to said head, and a strain gage unit, said combination being for transducing the pressure in said cylinder, said head having a passage and an aperture, said fastening assembly including a stud-bolt-type member, a nut-type member and a securing member, said securing member having a sleeve and a peripheral bore, said head being mounted on an approximately transverse side of said block, said securing member being positioned above said head so that said sleeve is in approximate alignment with said passage and said bore is in approximate alignment with said aperture, said nozzle being positioned approximately normal to said approximately transverse side and through said sleeve and said passage so as to protrude into said cylinder, said stud-bolt-type member being positioned approximately parallel to said nozzle and through said bore so as to engage said nut-type member over said bore and to engage said aperture, said cylinder containing a piston capable of reciprocation in a bidirection which is approximately normal to said approximately transverse side, said reciprocation causing a deforming force generally emanating through said combination in an upward direction which is approximately normal to said approximately transverse side, said deforming force thereby stretching said stud-bolt-type member, said strain gage unit being coupled with said stud-bolt-type member, said strain gage unit thereby being responsive to said stretching so as to be indicative of said pressure.

2. The combination for transducing the pressure in a cylinder as in claim 1, wherein said strain gage unit is internally installed in said stud-bolt-type member.

3. The combination for transducing the pressure in a cylinder as in claim 1, wherein said strain gage unit is externally installed on said stud-bolt-type member.

4. The combination for transducing the pressure in a cylinder as in claim 1, wherein said strain gage unit includes four strain gages configured in a full Wheatstone bridge.

5. The combination for transducing the pressure in a cylinder as in claim 1, comprising data acquisition means which is connected to said strain gage unit.

6. A transducer for measuring pressure in an engine cylinder which is housed in a block of an internal combustion engine, said cylinder containing a piston which moves approximately vertically up-and-down, said block having an approximately horizontal upper block surface, said transducer comprising:

an approximately vertical fuel injector including a lateral protrusion and a nose which is directed into said cylinder;

a head which adjoins said block at said upper block surface, said head having an upper head surface and holding said fuel injector whereby said lateral protrusion is aboveadjacent said upper head surface;

means for securing said fuel injector to said head, said means for securing including an approximately horizontal crosspiece and an approximately vertical fastener, said crosspiece accommodating said fuel injector and said fastener whereby said lateral protrusion is belowadjacent said crosspiece and is juxtaposed said fastener, said fastener engaging said head at said upper head surface; and a strain gage unit which is coupled with said fastener whereby, when said piston moves, changes in said pressure cause an approximately vertical variable forcible exertion which includes a pushing upon said nose, said variable forcible exertion resulting in tensile and compressive stresses upon said fastener, said stresses producing strains of said fastener which are determinable by said strain gage unit and which are commensurate with said changes in said pressure.

7. A transducer for measuring pressure as in claim 6, wherein said fastener is a fuel injector stud.

8. A transducer for measuring pressure as in claim 6, wherein said strain gage unit is located in said fastener.

9. A transducer for measuring pressure as in claim 8, wherein said fastener has an axial hole and said strain gage unit is located in said hole.

10. A transducer for measuring pressure as in claim 6, wherein said strain gage unit is located on said fastener.

11. A transducer for measuring pressure as in claim 6, wherein said strain gage unit includes four strain gages configured in a full Wheatstone bridge.

12. A transducer for measuring pressure as in claim 6, comprising:

a direct current power supply which sends voltage to said strain gage unit;

an amplifier of signals received from said strain gage unit;

a processor of said amplified signals; and means for manifesting information pertaining to said processed signals.

13. A transducer for measuring pressure as in claim 6, wherein said variable forcible exertion includes a bulging of said upper head surface.

14. A transducer for measuring pressure as in claim 6, wherein said fuel injector is approximately symmetrical with respect to an approximately vertical infinite fuel injector axis, said cylinder is approximately symmetrical with respect to an approximately vertical infinite cylinder axis, and said infinite fuel injector axis and said infinite cylinder axis are approximately coincident.

15. A method for transducing pressure in a cylinder of an internal combustion engine, said method comprising:

providing said internal combustion engine which includes said cylinder, a fuel injector nozzle, a block and a head, said block housing said cylinder, said cylinder containing a piston which reciprocates approximately in the axial direction of said cylinder during actuation of said engine, said head being affixed to said block, said head holding said nozzle so as to protrude into said cylinder and be situated approximately in axial alignment with said cylinder;

coupling a strain gage unit with a substantially rod-shaped fastening member; and securing said nozzle with respect to said head, said securing including implementing said substantially rod-shaped fastening member so as to be situated approximately parallel to said nozzle and be in communication with said nozzle and said head;

whereby, during said actuation of said engine, a force is applied to said nozzle approximately in said axial direction, said force displacing said nozzle, said displacement tensing said substantially rod-shaped fastening member, said tension straining said substantially rod-shaped fastening member, said strain corresponding to said pressure and being measurable by said strain gage unit.

16. A method for transducing pressure as in claim 15, wherein said coupling includes boring an axial hole in said substantially rod-shaped fastening member and locating said strain gage unit in said hole.

17. A method for transducing pressure as in claim 15, comprising actuating said engine and measuring said strain.

18. A method for transducing pressure as in claim 17, wherein said measuring includes:

sending direct current voltage to said strain gage unit;

amplifying signals received from said strain gage unit;

processing said amplified signals; and manifesting information pertaining to said processed signals.

19. Apparatus for transducing pressure in a cylinder of an internal combustion engine, said cylinder containing a piston which reciprocates approximately in the axial direction of said cylinder during actuation of said engine, said apparatus comprising:

a fuel injector nozzle;

a block housing said cylinder;

a head affixed to said block, said head holding said nozzle so as to protrude into said cylinder and be situated approximately in axial alignment with said cylinder;

means for securing said nozzle with respect to said head, said means for securing including a substantially rod-shaped fastening member which is situated approximately parallel to said nozzle and is in communication with said nozzle and said head; and a strain gage unit coupled with said substantially rod-shaped fastening member;

whereby, during said actuation of said engine, a force is applied to said nozzle approximately in said axial direction, said force displacing said nozzle, said displacement tensing said substantially rod-shaped fastening member, said tension straining said substantially rod-shaped fastening member, said strain corresponding to said pressure and being measurable by said strain gage unit.

20. Apparatus for transducing pressure as in claim 19, wherein said force is a variable force, said displacement is a variable displacement, said tension is a variable tension, and said strain is a variable strain corresponding to variable said pressure.

* * * * *